United States Patent
Jia (10) Patent No.: US 12,190,651 B2
(45) Date of Patent: Jan. 7, 2025

(54) BLACK BOX DATA MANAGEMENT METHOD, APPARATUS, AND DEVICE FOR INTELLIGENT DRIVING VEHICLE

(71) Applicant: HUAWEI TECHNOLOGIES CO., LTD., Shenzhen (CN)

(72) Inventor: Xiaolin Jia, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 281 days.

(21) Appl. No.: 17/665,143

(22) Filed: Feb. 4, 2022

(65) Prior Publication Data

US 2022/0157092 A1    May 19, 2022

Related U.S. Application Data

(63) Continuation of application No. PCT/CN2020/081534, filed on Mar. 27, 2020.

(30) Foreign Application Priority Data

Aug. 7, 2019    (CN) .......................... 201910726567.X (51) Int. Cl.
  *G07C 5/02*    (2006.01)
  *B60W 30/09*    (2012.01)
  (Continued)

(52) U.S. Cl.
  CPC .............. *G07C 5/02* (2013.01); *B60W 30/09* (2013.01); *B60W 30/0953* (2013.01);
  (Continued)

(58) Field of Classification Search
  CPC ........ G07C 5/02; G07C 5/008; G07C 5/0841; G07C 5/085; B60W 30/09;
  (Continued)

(56) References Cited

U.S. PATENT DOCUMENTS 10,282,922 B1    5/2019  Nejah et al.
10,909,782 B1 *  2/2021  Natanzon ............. G07C 5/0841
(Continued)

FOREIGN PATENT DOCUMENTS

CN    101958009 A    1/2011
CN    105243702 A    1/2016
(Continued)

OTHER PUBLICATIONS

Machine Translation of CN105346483A (Year: 2016).*
(Continued)

*Primary Examiner* — Sahar Motazedi
(74) *Attorney, Agent, or Firm* — Rimon PC (57) ABSTRACT

Provided is a black box data management method and apparatus for an intelligent driving vehicle. A black box device first obtains black box data based on a black box trigger event, wherein the black box device is configured to manage the black box data in the intelligent driving vehicle. The black box device evaluates a storage level of the black box data based on an event type of the black box trigger event and a data type of the black box data. The black box device stores the black box data based on the storage level and according to a preset rule.

19 Claims, 5 Drawing Sheets

(51) Int. Cl.
  *B60W 30/095* (2012.01)
  *B60W 40/08* (2012.01)
  *B60W 50/02* (2012.01)
  *B60W 50/08* (2020.01)
  *B60W 60/00* (2020.01)
  *B60W 30/08* (2012.01)

(52) U.S. Cl.
  CPC ........ *B60W 30/0956* (2013.01); *B60W 40/08* (2013.01); *B60W 50/0205* (2013.01); *B60W 50/082* (2013.01); *B60W 60/0051* (2020.02); *B60W 60/0053* (2020.02); *B60W 2030/082* (2013.01); *B60W 2554/80* (2020.02)

(58) Field of Classification Search
  CPC ......... B60W 30/0953; B60W 30/0956; B60W 40/08; B60W 50/0205; B60W 50/082; B60W 60/0051; B60W 60/0053; B60W 2030/082; B60W 2554/80
  See application file for complete search history.

(56) References Cited

U.S. PATENT DOCUMENTS

2010/0238009 A1   9/2010   Cook et al.
2017/0197632 A1*  7/2017   Rieth .................. B60W 50/082
2019/0220011 A1   7/2019   Della Penna
2019/0302766 A1* 10/2019   Mondello ............. H04L 9/3247

FOREIGN PATENT DOCUMENTS

| CN | 105346483 | A | * | 2/2016 |
| CN | 105976450 | A |   | 9/2016 |
| CN | 108876965 | A |   | 11/2018 |
| CN | 108961462 | A | * | 12/2018 |
| CN | 109215160 | A |   | 1/2019 |
| CN | 109215162 | A |   | 1/2019 |
| CN | 109215170 | A |   | 1/2019 |
| CN | 109788025 | A |   | 5/2019 |
| CN | 109830002 | A | * | 5/2019 |
| EP | 3073449   | A1 |  | 9/2016 |
| EP | 3159853   | B1 |  | 3/2019 |
| KR | 20190086848 | A | | 7/2019 |

OTHER PUBLICATIONS

Machine Translation of CN108961462A (Year: 2018).*
Machine Translation of CN109830002A (Year: 2019).*
ITU-T H.265,Series H: Audiovisual and Multimedia Systems,Infrastructure of audiovisual services Coding of moving video,High efficiency video coding,(Jun. 2019),total 696 pages.

* cited by examiner

BLACK BOX DATA MANAGEMENT METHOD, APPARATUS, AND DEVICE FOR INTELLIGENT DRIVING VEHICLE

CROSS-REFERENCE TO RELATED APPLICATIONS

This application is a continuation of International Application No. PCT/CN2020/081534 filed on Mar. 27, 2020, which claims priority to Chinese Patent Application No. 201910726567.X filed on Aug. 7, 2019. The disclosures of the aforementioned applications are hereby incorporated by reference in their entireties.

TECHNICAL FIELD

This application relates to the vehicle field, and in particular, to a black box data management method, apparatus, and a device for an intelligent driving vehicle.

BACKGROUND

In recent years, intelligent driving vehicles have become a new trend of development in the vehicle field. An increasing quantity of vehicles use an advanced driver assistance system (ADAS) and an automated driving system. In such a system, an in-vehicle mobile data center (MDC) and in-vehicle sensors are used to intelligently detect obstacles, perceive surrounding environment, automatically determine vehicle paths, and control the driving status of the vehicle in a driving process. Intelligent driving technology brings revolutionary opportunities and challenges to the vehicle field. More manufacturers are committed to using intelligent driving to improve driver experience in vehicle driving.

Safety of the intelligent driving vehicles also attracts wide attention from the industry. Conventional manual driving vehicles generally use black box devices to record engine speed, vehicle speed, brake status, accelerator status, and seat belt status of the vehicle before and after an accident. A black box is a type of device that has high damage resistance and is installed in the vehicle. When a violent collision occurs on the vehicle, the black box may determine, by using data provided by an acceleration sensor in the vehicle that is connected to the black box device, whether the acceleration of the vehicle in a short period of time exceeds a preset threshold, and subsequently collect and store vehicle body data. However, compared with the conventional manual driving vehicle, the intelligent driving vehicle has greatly changed in aspects such as application scenario, driver driving habit and manner, working manner of each system in the intelligent driving vehicle, and relationship between the vehicle body and its surroundings and other vehicles. The intelligent driving vehicle also poses higher safety requirement to its black box data management method. Therefore, how to provide a more effective black box management method applicable to the intelligent driving vehicle becomes an urgent technical problem to be addressed.

SUMMARY

This application provides a black box management method, apparatus, device, and system for an intelligent driving vehicle, to improve effectiveness of black box data in the intelligent driving vehicle and improve overall safety of the entire intelligent driving vehicle.

According to a first aspect, a black box data management method for an intelligent driving vehicle is provided. The method includes: A black box device first obtains black box data based on a received black box trigger event sent by a detection controller; then evaluates a storage level of the black box data based on an event type of the black box trigger event and a data type; and then stores the black box data based on the storage level and according to a preset rule. According to the method, the black box trigger event triggers the black box device to obtain the black box data, and the black box device evaluates the storage level of the black box data, and then stores the black box data based on the storage level and according to the preset rule, to store different types of data in different storage manners and storage durations, so that a fault can be accurately identified by using the black box data in subsequent responsibility demarcation, thereby improving the accuracy of the black box data.

In a possible implementation, the black box device and the detection controller communicate with each other through a bus inside the vehicle, the black box device receives, in real time, the black box data sent by the detection controller, and when the black box device receives a black box trigger event notification sent by the detection controller, the black box device identifies the data type of the black box data. The black box trigger event notification is generated by the detection controller based on the black box trigger event, the black box trigger event includes one or both of the following events: a driving mode switching event and a driving risk boundary event, and the data type includes responsibility demarcation data, assistant demarcation data, and risk data. In this application, in light of the characteristics of automated driving scenarios, a new type of the black box trigger event is added, so that the accident responsibility can be more accurately determined in a subsequent collision accident. In a non-collision accident, the risk data in a driving process may also be identified based on content recorded in the black box data. Further, the risk data may be analyzed by using a third-party management system, to remind the driver of risks and problems that exist when the intelligent driving vehicle runs, so that driving safety of the intelligent driving vehicle is effectively improved.

In another possible implementation, the driving mode switching event includes at least one of the following cases: a driver switches a driving mode of the intelligent driving vehicle to an intelligent driving mode, a driver actively switches a driving mode of the intelligent driving vehicle to a non-intelligent driving mode, or a driver passively switches a driving mode of the intelligent driving vehicle to a non-intelligent driving mode. In this application, through monitoring the driving mode switching of the intelligent driving vehicle, the cause and time of switching between an automated driving mode and a manual driving mode is recorded. When a collision accident occurs, this can assist in analyzing the cause of the accident, so that the accident's main responsible party can be further determined.

In another possible implementation, the driving risk boundary event includes at least one of the following cases:
when the intelligent driving vehicle runs in an intelligent driving mode, a collision occurs between the intelligent driving vehicle and another vehicle;
when the intelligent driving vehicle runs in an intelligent driving mode, a distance between the intelligent driving vehicle and another vehicle reaches a preset threshold, and a forward or lateral collision risk event occurs because of emergency braking or emergency lane change of the intelligent driving vehicle; or when a collision occurs on the intelligent driving vehicle, there is a negative acceleration that exceeds a boundary value.

In this application, the driving risk boundary event is added and the black box data is recorded before and after a trigger event occurs, to assist in determining a division of the accident responsibility.

In another possible implementation, the determining, by the black box device, a storage level of the black box data based on a type of the black box trigger event and a data type includes:

when the type of the trigger event is collision, classifying responsibility demarcation data as first-level storage data, where the responsibility demarcation data is used to identify data that can clarify the responsibility in a collision;

when the type of the trigger event is collision, classifying assistant demarcation data as second-level storage data, where the assistant demarcation data is used to identify data that can assist in determining the responsibility in a collision; or when the type of the trigger event is non-collision, classifying risk data as third-level storage data.

In this application, different types of black box data are classified under different storage levels, and are further stored in different storage media based on the storage levels, and storage durations of different black box data are controlled. Therefore, the storage duration of useful data is ensured to be long enough to facilitate subsequent responsibility positioning and accident cause analysis, and data backup can be implemented by using a cloud storage and a local storage to avoid a problem that the cause of an accident cannot be identified due to a data loss. In addition, some black box data is periodically deleted to effectively save storage space and improve storage space utilization.

In another possible implementation, when the black box data is classified as the first-level storage data, the responsibility demarcation data is separately stored in a local storage and a cloud storage of the black box device, and the responsibility demarcation data is permanently stored in the local storage and the cloud storage of the black box device, where the local storage is a storage in the black box device, the cloud storage is a storage provided by a cloud service center to the black box, and the black box device and the cloud storage communicate with each other through a network;

when the black box data is classified as the second-level storage data, the responsibility demarcation data is stored in a local storage of the black box device, and the assistant demarcation data is sent to a cloud service data center for storage in a cloud storage, and the foregoing assistant demarcation data does not need to be permanently stored in the local storage and the cloud storage of the black box device; or when the black box data is classified as the third-level storage data, the risk data is classified as the third-level storage data, the risk data is stored in a local storage of the black box device, and the risk data is sent to a cloud service data center for storage in a cloud storage, and the foregoing risk data does not need to be permanently stored in the local storage and the cloud storage of the black box device.

In another possible implementation, when storing the black box data, the black box device sets duration for storing data in the local storage and the cloud storage, and when a first threshold is met, deletes all or a part of data stored in the local storage and/or the cloud storage.

In this application, different types of black box data are classified under different storage levels, and are further stored in different storage media based on the storage levels, and storage durations of different black box data are controlled. Therefore, the storage duration of useful data is ensured to be long enough to facilitate subsequent responsibility positioning and accident cause analysis, and data backup can be implemented by using the cloud storage and the local storage to avoid a problem that the cause of an accident cannot be identified due to a data loss. In addition, some black box data is periodically deleted to save storage space and improve storage space utilization.

In another possible implementation, the black box trigger event includes one or more of the following events:

1. when the intelligent driving vehicle is in a non-intelligent driving mode, a driver enables an intelligent driving mode by using a human-computer interaction controller;
2. when the intelligent driving vehicle is in an intelligent driving mode, a driver steps on a brake pedal;
3. when the intelligent driving vehicle is in an intelligent driving mode, a driver turns a steering wheel;
4. when the intelligent driving vehicle is in an intelligent driving mode, a driver switches the intelligent driving mode to a manual driving mode by using a human-computer interaction controller;
5. when the intelligent driving vehicle is in an intelligent driving mode, a collision occurs between the intelligent driving vehicle and another vehicle or object;
6. when the intelligent driving vehicle is in an intelligent driving mode, the intelligent driving vehicle brakes emergently;
7. when the intelligent driving vehicle is in an intelligent driving mode, an instantaneous acceleration of the intelligent driving vehicle exceeds a preset value; or
8. when the intelligent driving vehicle is in an intelligent driving mode, a hardware fault occurs on the intelligent driving vehicle, where the hardware fault includes a processor reset and a sensor fault.

1 to 4 may also be referred to as intelligent driving vehicle driving mode switching events, and 5 to 8 may also be referred to as driving risk boundary events.

In another possible implementation, when a collision occurs on the intelligent driving vehicle, the trigger event, its timestamp, and one or more of the following data within a preset time period before and after the trigger event: key demarcation data, system status, positioning and planning and control structured data, structured data of close distance traffic participants, and sensor data in the direction of the collision are permanently stored in a local storage and a cloud storage.

In another possible implementation, when a collision occurs on the intelligent driving vehicle, data that mainly assists in determining an accident and/or sensor data of the intelligent driving vehicle in a preset time period before and after a trigger event occurs are stored in a local storage and a cloud storage, and when its duration exceeds a second threshold, data stored in the local storage is deleted.

In another possible implementation, when no collision occurs on the intelligent driving vehicle, one or more of the following data in a preset time period before and after a trigger event: all sensor data in the intelligent driving vehicle, perception, fusion, positioning, and planning and control structured data, driver status, driving subject, and vehicle body data are stored in the local storage and the cloud storage, and after the cloud storage completes storing the data, the data stored in the local storage is deleted. In some embodiments, the vehicle body data includes one or more of the following: vehicle speed, engine speed, chassis electronic control unit status, and seat belt status.

Through the foregoing descriptions, according to the black box data management method provided in this application, with reference to additional scenarios in intelligent driving, a new type of black box trigger event is added to record black box data during intelligent driving mode switching, to provide a basis for accurate evaluation of the risk and dispute during intelligent driving mode switching. In addition, trigger events for driving risk boundary detection enrich running scenarios of the intelligent driving vehicle, and provide a favorable basis for aspects such as accident responsibility determining and dispute. In addition, this application further provides a method of classifying and storing black box data in different places. The black box device may store data in some storages based on an event type, and control data storage duration in the cloud storage by using a retention time limit, thus ensuring that black box data can be more effectively backed up and stored, and durations for storing essential and non-essential black box data in the cloud storage are controlled, and cloud storage is used effectively to back up black box data, thereby ensuring utilization of cloud storage.

According to a second aspect, this application provides a black box data management apparatus for an intelligent driving vehicle. The management apparatus includes modules configured to perform the black box data management method for the intelligent driving vehicle in the first aspect or any one of the possible implementations of the first aspect.

According to a third aspect, this application provides an intelligent driving vehicle. The intelligent driving vehicle includes a detection controller and a black box device, where the detection controller is configured to: detect a black box trigger event; and send a black box trigger event detection result notification to the black box device based on the black box trigger event; and the black box device is configured to: obtain black box data based on the black box trigger event notification, and identify a data type; evaluate a storage level of the black box data based on a type of the trigger event and the data type; and store the black box data based on the storage level of the black box data and according to a preset rule.

In a possible implementation, the black box is further configured to perform the operation steps of the method implemented by the black box device in the first aspect or any one of the possible implementations of the first aspect.

In another possible implementation, the detection controller is further configured to perform the operation steps of the method implemented by the detection controller in the first aspect or any one of the possible implementations of the first aspect.

According to a fourth aspect, this application provides a black box device. The black box device includes a processor, a storage, a communication interface, and a bus, where the processor, the storage, and the communication interface are connected through the bus and implement mutual communication, the storage is configured to store computer executable instructions, and when the black box device runs, the processor executes the computer executable instructions in the storage to perform, by using a hardware resource in the black box device, the operation steps performed by the black box device in the method in the first aspect or any one of the possible implementations of the first aspect.

According to a fifth aspect, this application provides a detection controller. The detection controller includes a processor, a storage, a communication interface, and a bus, where the processor, the storage, and the communication interface are connected through the bus and implement mutual communication, the storage is configured to store computer executable instructions, and when the black box device runs, the processor executes the computer executable instructions in the storage to perform, by using a hardware resource in the detection controller, the operation steps performed by the detection controller in the method in the first aspect or any one of the possible implementations of the first aspect.

According to a sixth aspect, this application provides a black box data management system, including a cloud service data center and an intelligent driving vehicle. The system includes the cloud data center and the intelligent driving vehicle. The cloud data center is connected to the intelligent driving vehicle through a network, and the cloud data center is configured to provide a cloud storage to the intelligent driving vehicle, so that all or some of black box data is stored in the cloud data center based on a storage level of the black box data, to implement backup of the black box data. The intelligent driving vehicle includes a black box device and a detection controller, separately configured to implement the operation steps performed by the black box device and the detection controller in the method in the first aspect or any one of the possible implementations of the first aspect.

According to a seventh aspect, this application provides a computer-readable storage medium. The computer-readable storage medium stores instructions, and when the instructions run on a computer, the computer performs the method in each of the foregoing aspects.

According to an eighth aspect, this application provides a computer program product including instructions. When the computer program product runs on a computer, the computer performs the method in each of the foregoing aspect.

In this application, the implementations provided in the foregoing aspects may be further combined to provide more implementations.

DESCRIPTION OF EMBODIMENTS

The following describes technical solutions in embodiments of this application with reference to the accompanying drawings in the embodiments of this application.

Figure 1:
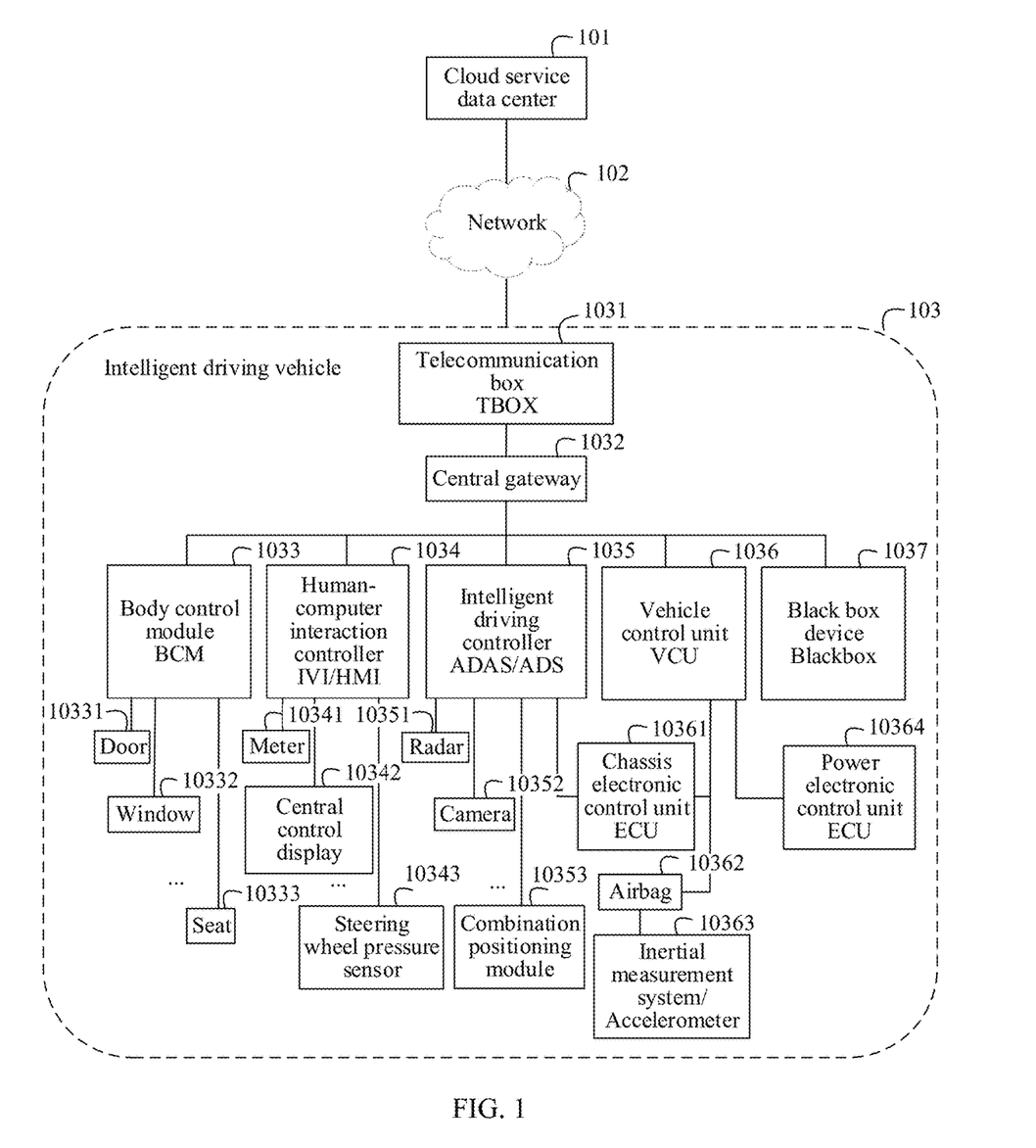
FIG. 1 is a schematic diagram of a logical architecture of a black box data management system for an intelligent driving vehicle according to this application.

FIG. 1 is a schematic diagram of a logical architecture of a black box data management system for an intelligent driving vehicle according to this application. As shown in the figure, the system includes a cloud data center 101, a network 102, and an intelligent driving vehicle 103, and the cloud data center 101 and the intelligent driving vehicle 103 communicate with each other through the network 102. The cloud service data center 101 is a data center that can provide a cloud service used to store black box data, including a private cloud, a public cloud, and a data center of a hybrid cloud type. The type of device in the cloud service data center and virtualization management manner are not limited in this application. The network 102 is a medium configured to transmit black box data in the intelligent driving vehicle to the cloud service data center. The network 102 includes a wired transmission manner and a wireless transmission manner. The wired transmission manner includes data transmission by using an Ethernet, an optical fiber, or the like, and the wireless transmission manner includes a transmission manner such as Wi-Fi, Bluetooth, or infrared.

The intelligent driving vehicle 103 includes a telecommunication box (TBOX) 1031, a central gateway 1032, a body control module (BCM) 1033, a human-computer interaction controller 1034, an intelligent driving controller 1035, a vehicle control unit 1036, and a black box device 1037. The foregoing components or devices may communicate with each other through a controller area network (CAN) or an Ethernet inside the vehicle. This is not limited in this application. The telecommunication box is configured to implement communication between the intelligent driving vehicle 103 and the cloud service data center 101. The body control module 1033 is configured to control basic hardware devices of the intelligent driving vehicle such as a door 10331, a window 10332, and a seat 10333. The human-computer interaction controller 1034 includes an in-vehicle infotainment (IVI) control system such as in-vehicle infotainment and/or a hardware monitor interface (HMI), is responsible for interaction between a person and the vehicle, and is usually configured to manage devices such as a meter 10341, a central control display 10342, and a steering wheel pressure sensor 10343. The intelligent driving controller 1035 includes an advanced driver assistance system (ADAS) and an assisted driving system (ADS), and is configured to control a radar 10351, a camera 10352, a combination positioning module 10353, and a chassis electronic control unit (ECU) 10361. The combination positioning module 10353 includes devices and sensors such as a global navigation satellite system (GNSS) and an inertial measurement unit (IMU). The global navigation positioning system can output global positioning information of specific precision (for example, 5-10 Hz), the intelligent driving system requires higher-frequency positioning information, and a frequency of the inertial measurement unit is usually relatively high (for example, 1000 Hz). The combination positioning module 10353 outputs precise positioning information of a high frequency (usually requiring at least 200 Hz) by integrating information of the inertial measurement unit and the global navigation satellite system. The chassis electronic control unit 10361 includes electronic control units of subsystems such as an electronic stability program (ESP) system, a Bosch brake booster (IBOOSTER), an electrical park brake (EPB), and electronic power steering (EPS). Each subsystem may be controlled by using one electronic control unit, or running of all subsystems may be controlled by using one electronic control unit. The vehicle control unit (VCU) is usually connected to the chassis electronic control unit, an airbag 10362, and a power electronic control unit, and the airbag 10362 is also connected to an inertial measurement unit/accelerator 10463. Through detection by the inertial measurement unit/accelerator 10463, it may be determined whether the intelligent driving vehicle is in an emergency braking state. If the intelligent driving vehicle is in this state, the airbag 10462 may pop up to protect driver safety. The power electronic control unit is configured to control the work of a power train. A vehicle power supply system may be used as the power train, and includes a subsystem that provides current conversion (for example, a subsystem of high-voltage direct current and low-voltage direct current conversion (DCDC)) and an on-board charger (OBC).

It should be noted that both the airbag 10362 and the combination positioning module 10353 are connected to an inertial measurement unit. In an implementation, two different inertial measurement units may be separately connected to the airbag 10362 and the combination positioning module 10353. The reason is: The combination positioning module 10353 requires low-delay and high-precision information of an inertial measurement unit. The airbag 10362 identifies a collision event by using a local inertial measurement unit, and then determines whether the airbag needs to pop up, which requires a quite short delay, and depending on an external inertial measurement unit incurs a data transmission delay, causing the airbag to fail to pop up in a timely manner. In addition, precision and function safety requirements of the two inertial measurement units are also inconsistent, and may be specifically set based on an actual vehicle control requirement.

The intelligent driving vehicle 103 further includes the black box device 1037. The black box device is configured to record vehicle body data of the intelligent driving vehicle in an emergency, and the vehicle body data includes but is not limited to one or more of the following data: engine speed, vehicle speed, braking force, steering angle, accelerator pedal status, seat belt status, and the timestamp of each piece of foregoing data.

Optionally, in addition to communicating with the outside through the telecommunication box, the intelligent driving vehicle may communicate with the outside through another device. Optionally, the management system shown in FIG. 1 may not include the central gateway 1032, and each controller is directly connected to the telecommunication box to implement communication between the intelligent driving vehicle and the data center.

Figure 2:
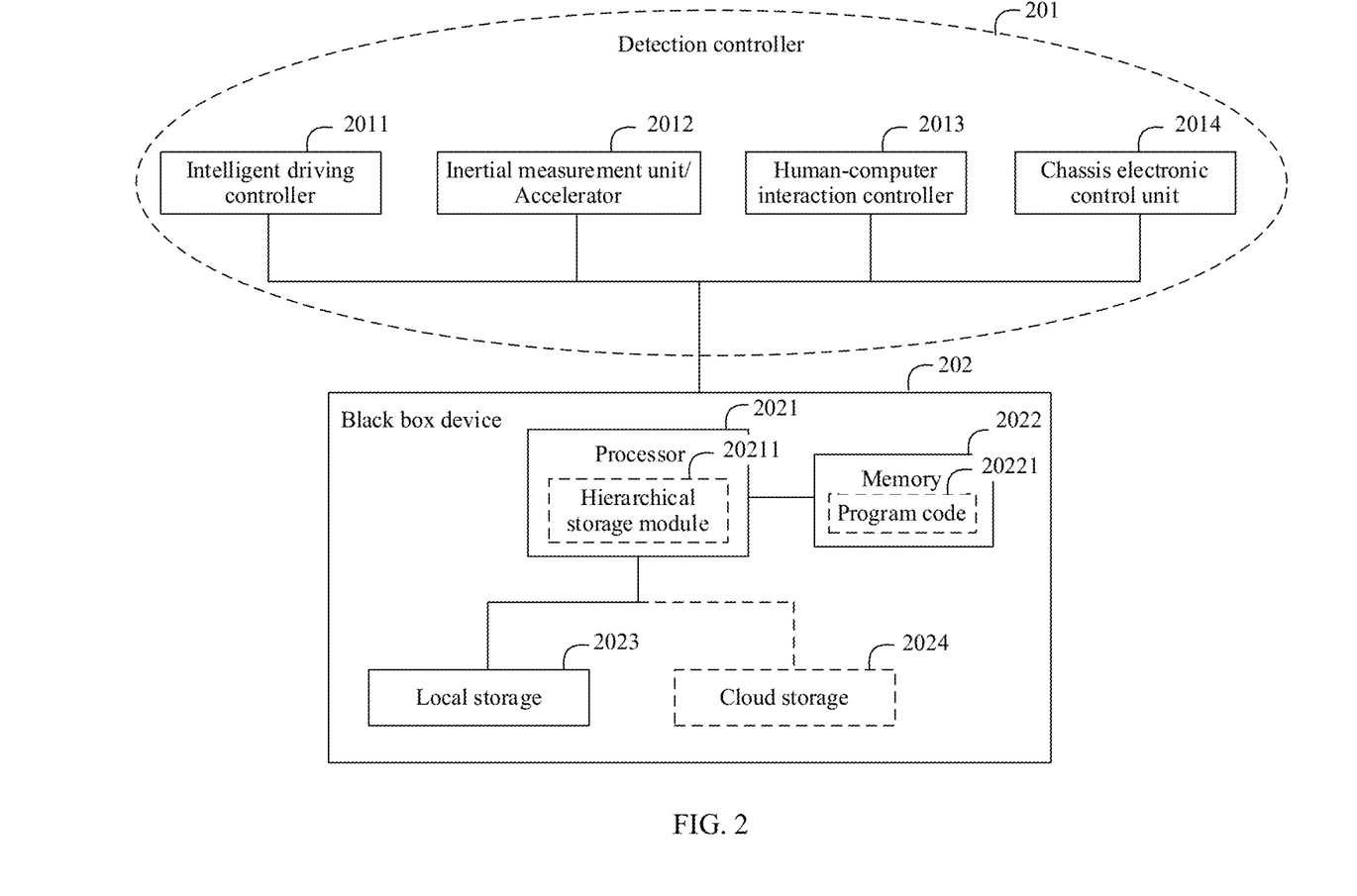
FIG. 2 is a schematic diagram of a logical architecture of another black box data management system for an intelligent driving vehicle according to this application.

FIG. 2 is a diagram of a logical architecture of another black box data management system for an intelligent driving vehicle according to an embodiment of this application. Different from FIG. 1, FIG. 2 further explains a relationship between a structure of a black box device and a detection controller that triggers a black box event. As shown in the figure, the system includes a black box data detection controller 201 and a black box device 202. The detection controller 201 includes an intelligent driving controller 2011, an inertial measurement unit 2012, a human-computer interaction controller 2013, and a chassis electronic control unit 2014. Functions of the foregoing control units or controllers are the same as those in FIG. 1. Details are not described herein again.

The black box device 202 includes a processor 2021, a memory 2022, a local storage 2023, and a cloud storage 2024. The processor 2021 includes a hierarchical storage module 20211, configured to: after black box data is obtained, identify a storage level of the data according to a preset rule, and separately store the data in the local storage 2023 and/or the cloud storage 2024 based on different levels. The local storage is a storage included in the black box device, in other words, the processor 2021 may communicate with the local storage 2023 through an internal bus. The cloud storage 2024 is a storage device provided by the cloud service data center to the intelligent driving vehicle in FIG. 1. A storage space size and a device type of the cloud storage 2024 may be set based on an actual requirement. This is not limited in this application. The black box device may communicate with the cloud service data center through a network, and upload the black box data to the cloud storage. For details, refer to FIG. 1. The black box 1037 may transmit the black box data to the telecommunication box 1031 by using the central gateway 1032, and then the telecommunication box 1031 uploads, through the network 102, the black box data to the cloud storage 2024 provided by the cloud service data center 101 to the intelligent driving vehicle 103.

It should be noted that the system architectures shown in FIG. 1 and FIG. 2 are merely examples for better describing the system architecture provided in the black box data management method provided in this application, and do not constitute a limitation on the embodiments of this application.

This application provides a black box data management method for an intelligent driving vehicle. Based on a black box data management method in a conventional manual driving vehicle, combined with the characteristics of intelligent driving scenarios, multi-dimensional black box data trigger events are introduced, and black box data is further classified under different storage levels based on the type of the trigger event, and is separately stored in a local storage or a cloud service data center, so that a mechanism of hierarchically storing black box data in different places based on the type of the trigger event is implemented, thereby improving the black box data management method and improving the effectiveness and security of black box data in the entire intelligent driving vehicle.

Figure 3:
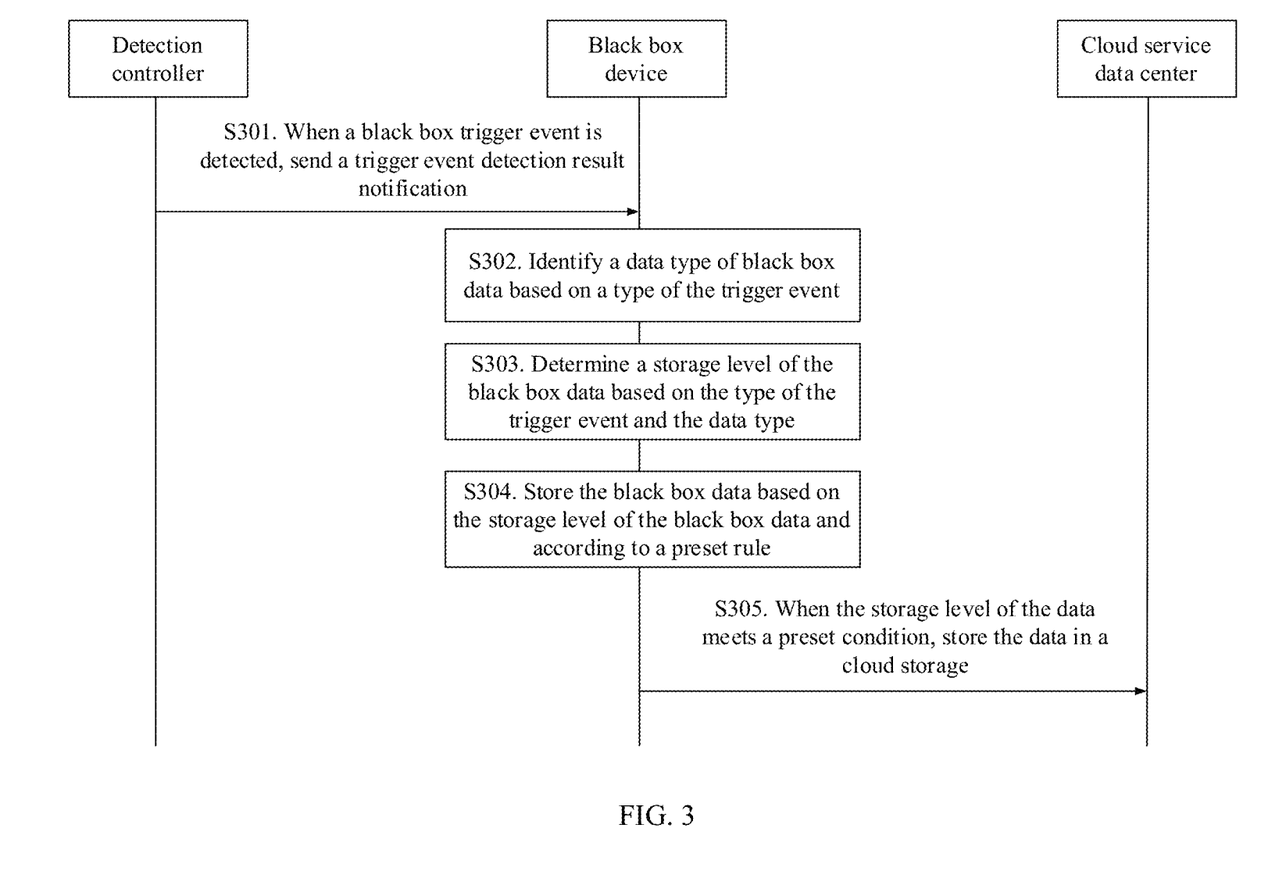
FIG. 3 is a schematic flowchart of a black box data management method for an intelligent driving vehicle according to this application.

Next, with reference to FIG. 3, the black box data management method for the intelligent driving vehicle provided in this application is described in detail. As shown in the figure, the method includes the following steps.

S301. When a detection controller detects a black box trigger event, the detection controller sends a trigger event notification to a black box device.

S302. The black box device identifies a data type of black box data based on a type of the trigger event.

The detection controller includes one or more components of the detection controller 201 shown in FIG. 2. To meet a requirement of an intelligent driving scenario, the black box trigger event that can be detected by the detection controller includes two types: a driving mode switching event and a driving risk boundary event. The driving mode switching event may further include at least one of the following cases:

Case 1: A driver switches the driving mode of an intelligent driving vehicle to an intelligent driving mode.

When the intelligent driving vehicle is in a manual driving mode, and an intelligent driving system detects that an intelligent driving enabling condition is met, the driver is notified by using a human-computer interaction controller (for example, an HMI), and the driver triggers, by using a button, the intelligent driving vehicle to switch to the intelligent driving mode. In this case, the human-computer interaction controller notifies the black box device that a black box trigger event exists.

In this case, the black box data includes one or more of the following data: intelligent driving system status information, driving subject information, HMI system driver status information, vehicle body data (including engine speed, vehicle speed, braking force, steering angle, accelerator pedal status, and seat belt status), and the timestamp of each piece of data.

Case 2: A driver actively switches the driving mode of an intelligent driving vehicle to a non-intelligent driving mode.

When the intelligent driving vehicle is in an intelligent driving mode, the driver may actively switch the intelligent driving vehicle to the non-driving mode by stepping on a brake, turning a steering wheel, and performing mode switching by using a human-computer interaction controller. In this case, the human-computer interaction controller may detect a black box data trigger event, and notify the black box device that the black box trigger event exists.

In this case, the black box data includes one or more of the following: intelligent driving system status information, driving subject information, HMI system driver status information, vehicle body data (including engine speed, vehicle speed, braking force, steering angle, accelerator pedal status, seat belt status, door status, seat status, and airbag status), and the timestamp of each piece of data.

Case 3: A driver passively switches the driving mode of an intelligent driving vehicle to a non-intelligent driving mode.

When the intelligent driving vehicle is in an intelligent driving mode, if an intelligent driving controller detects an internal error or fault of the system (for example, a processor reset or a sensor fault), the intelligent driving controller sends a notification to a human-computer interaction controller, to direct, through a text or voice, the driver to switch the driving mode to the non-intelligent driving mode, and at the same time, the intelligent driving controller further notifies the black box device that a black box trigger event exists.

In this case, the black box data includes one or more of the following: intelligent driving system status information, driving subject information, HMI system driver status information, vehicle body data (including engine speed, vehicle speed, braking force, steering angle, accelerator pedal status, seat belt status, door status, seat status, and airbag status), an intelligent driving system fault type, intelligent driving system sensor data, perception, fusion, positioning, and planning and control structured data of an intelligent driving system, and the timestamp of each piece of data.

It should be noted that the black box data in the foregoing cases includes but is not limited to the foregoing data. During specific implementation, content recorded in the black box data may be set based on a requirement or a criterion.

For the second type, the driving risk boundary event may further include the following several cases:

Case 1: When an intelligent driving vehicle runs in an intelligent driving mode, if there is a collision between vehicles, or a collision risk event such as emergency braking triggered by an intelligent driving controller because vehicles are quite close, the intelligent driving controller sends a notification to a human-computer interaction controller, to direct, through a text or voice, a driver to switch a driving mode to a non-intelligent driving mode, and at the same time, the intelligent driving controller further notifies the black box device that a black box trigger event exists.

The black box data includes one or more of the following: intelligent driving system status information, driving subject information, HMI system driver status information, vehicle body data (including engine speed, vehicle speed, braking force, steering angle, accelerator pedal status, and seat belt status), the timestamp of each piece of data, intelligent driving system sensor data, and perception, fusion, positioning, and planning and control structured data of an intelligent driving system.

Case 2: When a collision occurs on an intelligent driving vehicle, there is a negative acceleration that exceeds a boundary value. In this case, an inertial measurement unit/accelerator determines, by using the accelerator, whether an acceleration of the intelligent driving vehicle exceeds a preset threshold, and if the acceleration exceeds the preset threshold, notifies the black box device that a black box trigger event exists.

The black box data includes one or more of the following: intelligent driving system status information, driving subject information, HMI system driver status information, vehicle body data (including engine speed, vehicle speed, braking force, steering angle, accelerator pedal status, and seat belt status), the timestamp of each piece of data, intelligent driving system sensor data, and perception, fusion, positioning, and planning and control structured data of an intelligent driving system.

In the foregoing cases, the vehicle body data may be collected by a vehicle control unit and a vehicle body control module and sent to the black box device.

It should be noted that the black box data in the foregoing cases includes but is not limited to the foregoing data. During specific implementation, content recorded in the black box data may be set based on a requirement or a criterion.

In a possible implementation, the intelligent driving controller 1035 shown in FIG. 1 includes a perception module, a fusion module, a positioning module, a planning and decision module, and a planning and control module. The modules may be separately implemented by independent hardware, or functions of the modules may be implemented by software in hardware. This is not limited in this application.

Further, the sensor data and system running status, perception, fusion, positioning, and planning and control structured data generated in a running process include but are not limited to the following content:

1. The sensor data includes data of sensors such as an image collection device (for example, an in-vehicle camera), a laser radar (LIDAR), a millimeter wave radar, an ultrasonic radar, a global positioning system, and an inertial measurement unit.
2. The system running status includes engine speed, vehicle speed, brake status, accelerator status, and seat belt status.
3. The perception structured data is generated by the perception module. The perception module is mainly responsible for preprocessing point cloud data collected by the laser radar (LIDAR), performing intelligent analysis on YUV/RGB image frame data collected by the camera, completing functions such as static/dynamic target object detection and tracking, lane line identification, traffic light identification, and obstacle identification, and outputting structured information to a fusion unit and a positioning unit of another calculation system while outputting the structured information to a fusion unit and a positioning unit of a current calculation unit. YUV is a color encoding method, and is often used in various video processing components. When encoding a photo or a video, YUV takes a human perception capability into account and allows reduced chrominance bandwidth. YUV is types of a compiled true-color (true-color) color space (color space). "Y" indicates luminance (Luma), namely, a grayscale value, and "U" and "V" indicate chrominance (Chroma), and are used to describe the color and saturation of an image and used to specify the color of a pixel. RGB is a color standard defined in the industry, and various colors are obtained through change and overlapping of three color channels: red (red, G), green (green, G), and blue (blue, B). RGB represents colors of the three channels: red, green, and blue. This standard almost includes all colors that can be perceived by human vision, and is one of the most widely used color systems.
4. For the fusion structured data, after receiving an obstacle list, depth information, lane line information, and drivable area information that are sent by the perception module, the fusion module performs smoothing processing to output an obstacle status estimation and a track prediction in a range of interest, and outputs final drivable area and obstacle information to the planning and decision unit.
5. For the positioning structured data, after receiving road feature information provided by the perception module, the positioning (spatial cognition) module integrates positioning information and a high-precision map with reference to a global positioning system (GPS)/inertial measurement unit (IMU)/wheel speedometer, and outputs spatial positioning information of the intelligent driving vehicle to the planning and decision module.
6. For the planning and control structured data, the planning and control module makes, based on the drivable area information, the positioning information, and the obstacle information provided by the fusion module and the positioning module and real-time motion information of the planning and control module, a behavior decision, including horizontal and vertical motion control plans; and generates a control instruction (including a brake, an accelerator, a steering wheel, a gear, a steering lamp, or the like) based on the motion control plans and a given speed.

Optionally, to reduce network resources occupied by data transmission, collected data may be compressed by using a preset algorithm. The preset algorithm includes but is not limited to camera H.265. For example, compressed data is usually used for storage, where camera H.265 compression is included, and another sensor performs compression by using a ZIP/LZS algorithm.

The black box device may obtain black box data in the following manner: Each detection controller collects data, and sends the data to the black box device in real time. The black box device stores, according to a preset rule, the black box data sent by each controller. The black box data may store the black box data by using a memory of the black box device or another storage medium. The preset rule may be that when a storage duration exceeds a first threshold (for example, 23 hours), some data is deleted based on storage duration. For example, after receiving the black box data sent by each detection controller in real time, the black box device stores the data in the memory of the black box device, and when the storage duration of the earliest data stored in the memory of the black box device is equal to 24 hours, deletes data stored in the 12 hours since the earliest time to release storage space of the storage device. Optionally, the black box device may obtain black box data in the following manner: Each detection controller collects black box data in real time, and after receiving a black box trigger event notification, the black box device sends a collection notification message to each detection controller. Each controller collects corresponding data based on the collection notification.

Further, when the black box device receives the black box trigger event notification sent by the detection controller, the black box device further identifies a data type of the black box data according to a preset rule, and may identify a data type of each piece of black box data based on a type of a trigger event. For example, the black box device classifies data that clarifies a vehicle collision cause as responsibility demarcation data, classifies data that can assist in determining a vehicle collision cause as assistant demarcation data, and classifies data that exists when no collision occurs but is risky to the running of the intelligent driving vehicle as risk data. For example, when a collision occurs on the intelligent driving vehicle, intelligent driving system sensor data, and perception, fusion, positioning, and planning and control structured data of the intelligent driving system are identified as responsibility demarcation data, and vehicle body data is identified as assistant demarcation data.

S303. The black box device determines a storage level of the data based on a type of a trigger event and the data type.

S304. The black box device stores the data based on the storage level of the data and according to a preset rule.

S305. When the storage level of the data meets a preset condition, the black box device sends the black box data to a cloud service data center.

When the type of the trigger event is collision, responsibility demarcation data is classified as first-level storage data, and the responsibility demarcation data is separately stored in a local storage and a cloud storage of the black box device, where the responsibility demarcation data is permanently stored in the local storage and the cloud storage of the black box device.

When the type of the trigger event is collision, assistant demarcation data is classified as second-level storage data, responsibility demarcation data is stored in a local storage of the black box device, and the assistant demarcation data is sent to a cloud service data center for storage in a cloud storage, where the assistant demarcation data does not need to be permanently stored in the local storage and the cloud storage of the black box device. Optionally, when the cloud data service data completes storing the assistant demarcation data, the assistant demarcation data stored in the local storage of the black box device is deleted.

When the type of the trigger event is non-collision (for example, a driving risk boundary event) and no collision occurs, risk data is classified as third-level storage data, the risk data is stored in a local storage of the black box device, and the risk data is sent to a cloud service data center for storage in a cloud storage, where the risk data does not need to be permanently stored in the local storage and the cloud storage of the black box device. Optionally, when the cloud data service data completes storing the black box data, the risk data stored in the local storage of the black box device is deleted.

In a possible embodiment, for black box data that is stored in the cloud storage and that does not need to be permanently stored, duration of storing the black box data in the cloud storage may be controlled by presetting a time limit, so that other key data is stored by using limited storage space of the cloud storage, thereby avoiding a storage failure problem caused by insufficient storage space.

In the black box device, the black box data may be hierarchically stored in different places by using the hierarchical storage module shown in FIG. 2. The hierarchical storage module may be a software module, or may be fabricated into a coprocessor, and the coprocessor is installed between a processor and a communication interface of the black box device, so that the coprocessor obtains the black box data and the event type in an accurate and timely manner, and determines the storage level of the data.

Through descriptions of the foregoing content, in this application, different types of black box data are classified under different storage levels, and are further stored in different storage media based on the storage levels, and storage durations of different black box data are controlled. Therefore, storage duration of useful data is ensured to be long enough to facilitate subsequent responsibility positioning and accident cause analysis, and data backup can be implemented by using the cloud storage and the local storage to avoid a problem that the cause of an accident cannot be identified due to data loss. In addition, some black box data is periodically deleted to save storage space and improve storage space utilization.

Next, the black box data management method provided in this embodiment of this application is further described with reference to specific examples. In this application, in light of the difference between an intelligent driving vehicle and a conventional vehicle in application scenarios, black box trigger events are added from a perspective of safety, responsibility demarcation data is distinguished depending on whether a collision is involved, and a storage location and storage duration of black box data are determined. The black box trigger events include one or more of the following events:

1. when the intelligent driving vehicle is in a non-intelligent driving mode, a driver enables an intelligent driving mode by using a human-computer interaction controller;
2. when the intelligent driving vehicle is in an intelligent driving mode, a driver steps on a brake pedal;
3. when the intelligent driving vehicle is in an intelligent driving mode, a driver turns a steering wheel;
4. when the intelligent driving vehicle is in an intelligent driving mode, a driver switches the intelligent driving mode to a manual driving mode by using a human-computer interaction controller;
5. when the intelligent driving vehicle is in an intelligent driving mode, a collision occurs between the intelligent driving vehicle and another vehicle or object;
6. when the intelligent driving vehicle is in an intelligent driving mode, the intelligent driving vehicle brakes emergently;
7. when the intelligent driving vehicle is in an intelligent driving mode, an instantaneous acceleration of the intelligent driving vehicle exceeds a preset value; or
8. when the intelligent driving vehicle is in an intelligent driving mode, a hardware fault occurs on the intelligent driving vehicle, where the hardware fault includes a processor reset and a sensor fault.

1 to 4 may also be referred to as intelligent driving vehicle driving mode switching events, and 5 to 8 may also be referred to as driving risk boundary events.

When a collision occurs on the intelligent driving vehicle, the trigger event, its timestamp, and one or more of the following data in a preset time period before and after the trigger event: key demarcation data, system status, positioning and planning and control structured data, structured data of close distance traffic participants, and sensor data in the direction of the collision are permanently stored in a local storage and a cloud storage.

When a collision occurs on the intelligent driving vehicle, data that mainly assists in determining an accident and/or sensor data of the intelligent driving vehicle in a preset time period before and after a trigger event occurs is stored in a local storage and a cloud storage, and when its storage duration exceeds a second threshold, data stored in the local storage is deleted.

When no collision occurs on the intelligent driving vehicle, all sensor data in the intelligent driving vehicle, perception, fusion, positioning, and planning and control structured data, driver status, driving subject, and vehicle body data in a preset time period before and after a trigger event occurs are stored in a local storage and a cloud storage, and after the cloud storage completes storing the data, the data stored in the local storage is deleted. In some embodiments, the vehicle body data includes one or more of the following data: vehicle speed, engine speed, chassis electronic control unit status, and seat belt status.

In a possible embodiment, the black box data storage process in FIG. 2 may be implemented by the intelligent driving controller 1035 in FIG. 1. Specifically, a black box management module may be disposed in the intelligent driving controller 1035, and the management module controls and obtains black box data, and stores the black box data in the black box device. In this case, the black box device is only used as a storage device for storing black box data, and allows the intelligent driving controller 1035 to write black box data into the black box device. For ease of description, the following descriptions in the embodiments of this application are provided by using the black box data management system shown in FIG. 1 and FIG. 2 as an example.

Through the descriptions of the foregoing embodiment, according to the black box data management method provided in this application, in light of newly added scenarios in intelligent driving, a new type of black box trigger event is added to record black box data during intelligent driving mode switching, to provide a basis for accurate evaluation of the risk and dispute during intelligent driving mode switching. In addition, trigger events for driving risk boundary detection enrich running scenarios of the intelligent driving vehicle, and provide a favorable basis for aspects such as accident responsibility determining and dispute. In addition, this application further provides a manner of hierarchically storing black box data in different places. The black box device may store data in some storages based on an event type, and control data storage duration in the cloud storage by using a retention time limit, thereby ensuring that black box data can be more effectively backed up and stored, and durations for storing essential and non-essential black box data in the cloud storage are controlled, and cloud storage is used effectively to back up black box data, thereby ensuring utilization of the cloud storage.

It should be noted that, for brief description, the foregoing method embodiments are represented as a series of actions. However, a person skilled in the art should appreciate that this application is not limited to the described order of the actions.

Other combinations of the steps that can be conceived by a person skilled in the art based on the foregoing described content also fall within the protection scope of this application. In addition, a person skilled in the art should also appreciate that all the embodiments described in the specification are example embodiments, and the related actions are not necessarily mandatory to this application.

Figure 4:
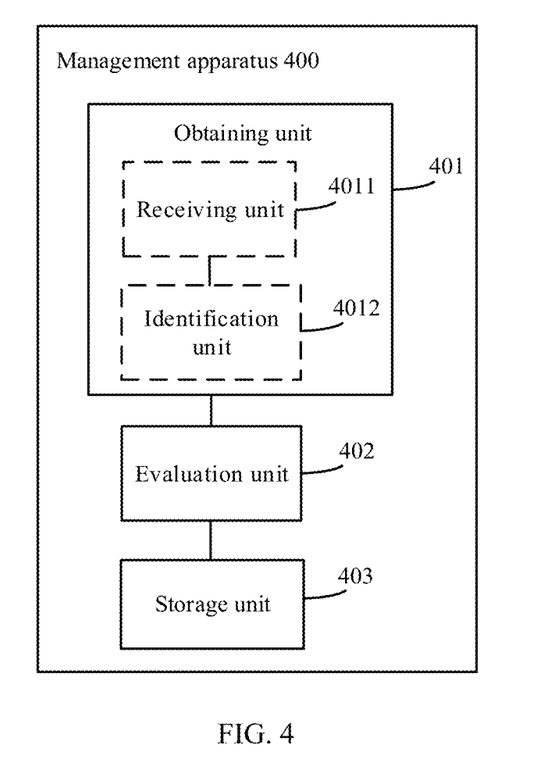
FIG. 4 is a schematic structural diagram of a black box data management apparatus for an intelligent driving vehicle according to this application.
Figure 5:
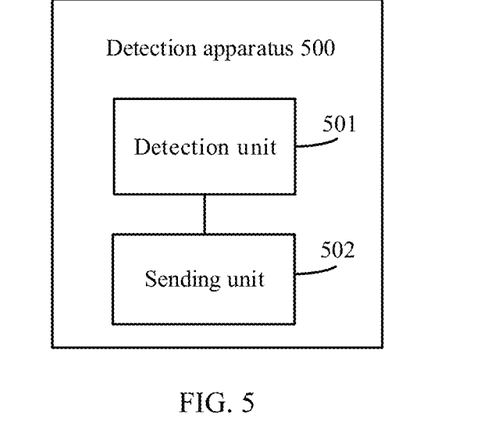
FIG. 5 is a schematic structural diagram of a black box data detection apparatus for an intelligent driving vehicle according to this application.
Figure 6:
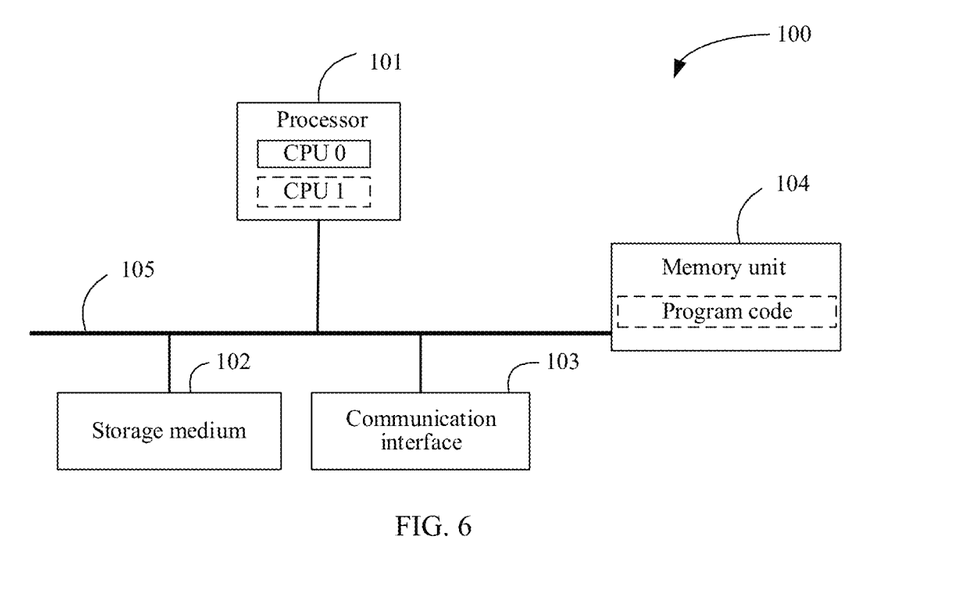
FIG. 6 is a schematic structural diagram of a black box device for an intelligent driving vehicle according to this application.

With reference to FIG. 1 to FIG. 3, the foregoing describes in detail the black box data management method provided in the embodiments of this application. With reference to FIG. 4 to FIG. 6, the following describes a black box data management apparatus, a black box device, and a detection controller provided in the embodiments of this application.

FIG. 4 is a black box data management apparatus 400 according to an embodiment of this application. The management apparatus 400 includes an obtaining unit 404, an evaluation unit 402, and a storage unit 403, where the obtaining unit is configured to obtain black box data based on a black box trigger event, where the black box device is configured to manage the black box data in an intelligent driving vehicle;

the evaluation unit is configured to evaluate a storage level of the black box data based on an event type of the black box trigger event and a data type; and the storage unit is configured to store the black box data based on the storage level and according to a preset rule.

It should be understood that the management apparatus 400 in this embodiment of this application may be implemented by using an application-specific integrated circuit (ASIC) or a programmable logic device (PLD). The PLD may be a complex programmable logic device (CPLD), a field-programmable gate array (FPGA), generic array logic (GAL), or any combination thereof. Alternatively, when the black box data management method shown in FIG. 3 is implemented by software, the management apparatus 400 and the modules of the management apparatus 400 may be software modules.

Optionally, the obtaining unit further includes a receiving unit 4011 and an identification unit 4012, where the receiving unit 4011 is configured to receive, in real time, the black box data sent by a detection controller, where the black box device and the detection controller communicate with each other through a bus inside the vehicle; and the identification unit 4012 is configured to: when a black box trigger event notification sent by the detection controller is received, identify the data type of the black box data, where the black box trigger event notification is generated by the detection controller based on the black box trigger event, the black box trigger event includes one or both of the following events: a driving mode switching event and a driving risk boundary event, and the data type includes responsibility demarcation data, assistant demarcation data, and risk data.

Optionally, the evaluation unit is further configured to: when the type of the trigger event is collision, classify responsibility demarcation data as first-level storage data, where the responsibility demarcation data is used to identify data that can determine the responsibility in a collision; when the type of the trigger event is collision, classify assistant demarcation data as second-level storage data, where the assistant demarcation data is used to identify data that assists in determining a responsibility in a collision; or when the type of the trigger event is non-collision and no collision occurs, classify risk data as third-level storage data.

Optionally, the storage unit is further configured to: when the black box data is classified as the first-level storage data, separately store the responsibility demarcation data in a local storage and a cloud storage of the black box device, where the responsibility demarcation data is permanently stored in the local storage and the cloud storage of the black box device, where the local storage is a storage in the black box device, the cloud storage is a storage provided by a cloud service center to the black box, and the black box device and the cloud storage communicate with each other through a network;

when the black box data is classified as the second-level storage data, store the responsibility demarcation data in a local storage of the black box device, and send the assistant demarcation data to a cloud service data center for storage in a cloud storage, where the assistant demarcation data does not need to be permanently stored in the local storage and the cloud storage of the black box device; or when the black box data is classified as the third-level storage data, classify the risk data as the third-level storage data, store the risk data in a local storage of the black box device, and send the risk data to a cloud service data center for storage in a cloud storage, where the risk data does not need to be permanently stored in the local storage and the cloud storage of the black box device.

Optionally, the storage unit is further configured to: when storing the black box data, set duration for storing data in the local storage and the cloud storage, and when the duration exceeds a first threshold, delete all or some of the data stored in the local storage and/or the cloud storage.

Optionally, the driving mode switching event includes at least one of the following cases: a driver switches a driving mode of the intelligent driving vehicle to an intelligent driving mode, a driver actively switches a driving mode of the intelligent driving vehicle to a non-intelligent driving mode, or a driver passively switches a driving mode of the intelligent driving vehicle to a non-intelligent driving mode.

Optionally, the driving risk boundary event includes at least one of the following cases:

when the intelligent driving vehicle runs in an intelligent driving mode, a collision occurs between the intelligent driving vehicle and another vehicle;

when the intelligent driving vehicle runs in an intelligent driving mode, the distance between the intelligent driving vehicle and another vehicle reaches a preset threshold, and a forward or lateral collision risk event occurs because of emergency braking or emergency lane change of the intelligent driving vehicle; or when a collision occurs on the intelligent driving vehicle, there is a negative acceleration that exceeds a boundary value.

The management apparatus 400 according to this embodiment of this application may correspondingly perform the method described in the embodiments of this application. In addition, the foregoing and other operations and/or functions of the units in the management apparatus 400 are separately used to implement corresponding procedures of the method in FIG. 3. For brevity, details are not described herein again.

FIG. 5 is a schematic structural diagram of a detection apparatus according to an embodiment of this application. As shown in the figure, the detection apparatus 500 includes a detection unit 501 and a sending unit 502, where the detection unit 501 is configured to: detect a black box trigger event according to a preset rule, and generate a black box event trigger notification; and the sending unit 502 is configured to send the black box event trigger notification to a black box device.

It should be understood that the management apparatus 400 in this embodiment of this application may be implemented by using an application-specific integrated circuit (ASIC) or a programmable logic device (PLD). The PLD may be a complex programmable logic device (CPLD), a field-programmable gate array (FPGA), generic array logic (GAL), or any combination thereof. Alternatively, when the black box data management method shown in FIG. 3 is implemented by software, the management apparatus 400 and the modules of the management apparatus 400 may be software modules.

The detection apparatus 500 according to this embodiment of this application may correspondingly perform the method described in the embodiments of this application. In addition, the foregoing and other operations and/or functions of the units in the detection apparatus 500 are separately used to implement corresponding procedures of the method in FIG. 3. For brevity, details are not described herein again.

FIG. 6 is a schematic diagram of a black box device 100 according to an embodiment of this application. As shown in the figure, the black box device 100 includes a processor 101, a storage medium 102, a communication interface 103, and a memory unit 104. The processor 701, the storage medium 102, the communication interface 103, and the memory unit 104 communicate with each other through the bus 105, or may implement communication through another means such as wireless transmission. The storage 102 is configured to store instructions, and the processor 101 is configured to execute the instructions stored in the storage 102. The storage 102 stores program code, and the processor 101 may invoke the program code stored in the storage 102 to perform the following operations:

obtaining black box data based on a black box trigger event;

evaluating a storage level of the black box data based on an event type of the black box trigger event and a data type; and storing the black box data based on the storage level and according to a preset rule.

It should be understood that in this embodiment of this application, the processor 101 may be a CPU, or the processor 101 may be another general-purpose processor, a digital signal processor (DSP), an application-specific integrated circuit (ASIC), a field programmable gate array (FPGA), or another programmable logic device, a discrete gate or transistor logic device, discrete hardware component, or the like. The general-purpose processor may be a microprocessor or any conventional processor or the like.

The storage 102 may include a read-only memory and a random access memory, and provide instructions and data to the processor 101. The storage 102 may further include a non-volatile random access memory. For example, the storage 102 may further store information about a device type.

The storage 102 may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM).

The bus 105 may include a power bus, a control bus, a status signal bus, and the like in addition to a data bus.

However, for clear description, various types of buses in the figure are marked as the bus 105.

It should be understood that the black box device 100 according to this embodiment of this application may correspond to the management apparatus 400 in the embodiments of this application, and may correspond to a corresponding subject in the method shown in FIG. 3 according to the embodiments of this application. In addition, the foregoing and other operations and/or functions of the modules in the black box device 100 are separately used to implement corresponding procedures of the method shown in FIG. 3. For brevity, details are not described herein again.

In a possible embodiment, this application further provides a detection controller. The detection controller may be either of the detection controllers shown in FIG. 1 or FIG. 2. For a structure of the detection controller, refer to FIG. 6 in which a processor, a storage medium, a communication interface, and a memory unit are included. The processor, the storage medium, the communication interface, and the memory unit communicate with each other through a bus, or may implement communication through another means such as wireless transmission. The storage is configured to store instructions, and the processor is configured to execute the instructions stored in the storage. The storage stores program code, and the processor 101 may invoke the program code stored in the storage 102 to perform the operation steps performed by the detection controller in the method shown in FIG. 3. For brevity, details are not described herein again.

In another possible embodiment, this application further provides an intelligent driving vehicle. The intelligent driving vehicle includes the black box device and the detection controller shown in FIG. 1, separately configured to implement the operation steps in the method shown in FIG. 3. For brevity, details are not described herein again.

In another possible embodiment, this application further provides a black box data management system. The system includes the cloud data center and the intelligent driving vehicle shown in FIG. 1. The cloud data center is connected to the intelligent driving vehicle through a network. The cloud data center is configured to provide a cloud storage to the intelligent driving vehicle, so that all or some of black box data is stored in the cloud data center based on a storage level of the black box data, and backup of the black box data is implemented. The intelligent driving vehicle includes a black box device and a detection controller, separately configured to implement the operation steps performed by the black box device and the detection controller in the black box data management method shown in FIG. 3. For brevity, details are not described herein again.

All or some of the foregoing embodiments may be implemented through software, hardware, firmware, or any combination thereof. When software is used to implement the embodiments, all or some of the foregoing embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid state drive (SSD).

The foregoing descriptions are merely specific implementations of this application. Changes or replacements that can be conceived by a person skilled in the art based on the specific implementations provided in this application shall fall within the protection scope of this application.

What is claimed is:

1. A black box data management method for an intelligent driving vehicle, wherein the method comprises:
    obtaining, by a black box device, black box data based on a black box trigger event, wherein the black box device is configured to manage the black box data in the intelligent driving vehicle;
    evaluating, by the black box device, a storage level of the black box data based on an event type of the black box trigger event and a data type of the black box data, wherein the data type of the black box data comprises at least one of responsibility demarcation data, or assistant demarcation data and risk data; and
    storing, by the black box device, the black box data based on the storage level and according to a preset rule, wherein
        when the event type of the black box trigger event is collision, classifying black box data of the responsibility demarcation data type as first-level storage data and black box data of the assistant demarcation data type as second-level storage data,
        when the event type of the black box trigger event is non-collision, classifying black box data of the risk data type as third-level storage data,
        when the black box data is classified as the first-level storage data, storing the black box data of the responsibility demarcation data type in a local storage of the black box device and a cloud storage, wherein the black box data of the responsibility demarcation data type is permanently stored in the local storage and the cloud storage,
        when the black box data is classified as the second-level storage data, sending the black box data of the assistant demarcation data type to the cloud storage, wherein the black box data of the assistant demarcation data type is not permanently stored in the cloud storage, and
        when the black box data is classified as the third-level storage data, storing the black box data of the risk data type in the local storage of the black box device and sending the black box data of the risk data type to the cloud storage, wherein the black box data of the risk data type is not permanently stored in the local storage and the cloud storage.

2. The method according to claim 1, wherein the method further comprises:
    when the black box device receives a black box trigger event notification, identifying, by the black box device, the data type of the black box data, wherein the black box trigger event notification is generated based on the black box trigger event.

3. The method according to claim 1, wherein the black box trigger event comprises a driving mode switching event.

4. The method according to claim 3, wherein the driving mode switching event comprises at least one of the following cases: driver switches a driving mode of the intelligent driving vehicle to an intelligent driving mode, driver actively switches the driving mode of the intelligent driving vehicle to a non-intelligent driving mode, or driver passively switches the driving mode of the intelligent driving vehicle to a non-intelligent driving mode.

5. The method according to claim 1, wherein the black box trigger event comprises a driving risk boundary event, where the driving risk boundary event comprises at least one of the following cases:
   when the intelligent driving vehicle runs in an intelligent driving mode, a collision occurs between the intelligent driving vehicle and another vehicle or object;
   when the intelligent driving vehicle runs in the intelligent driving mode, a distance between the intelligent driving vehicle and another vehicle reaches a preset threshold, and a forward or lateral collision risk event occurs because of emergency braking or emergency lane change of the intelligent driving vehicle; or
   when a collision occurs on the intelligent driving vehicle, there is a negative acceleration that exceeds a boundary value.

6. The method according to claim 1, wherein the responsibility demarcation data type is used to identify data that can determine a responsibility in a collision, and the assistant demarcation data type is used to identify data that assists in determining a responsibility in a collision.

7. The method according to claim 1, wherein when storing the black box data based on the storage level and according to the preset rule, the black box device sets a duration for storing all or a part of the black box data and the method further comprises:
   deleting all or a part of the black box data stored in at least one of the local storage or the cloud storage when the duration exceeds a first duration threshold.

8. The method according to claim 1, wherein the black box trigger event comprises:
   when the intelligent driving vehicle is in a non-intelligent driving mode, a driver enables an intelligent driving mode by using a human-computer interaction controller.

9. The method according to claim 1, wherein the black box trigger event comprises:
   when the intelligent driving vehicle is in an intelligent driving mode, a driver steps on a brake pedal.

10. The method according to claim 1, wherein the black box trigger event comprises:
    when the intelligent driving vehicle is in an intelligent driving mode, a driver turns a steering wheel.

11. The method according to claim 1, wherein the black box trigger event comprises:
    when the intelligent driving vehicle is in an intelligent driving mode, a driver switches the intelligent driving mode to a manual driving mode by using a human-computer interaction controller.

12. The method according to claim 1, wherein the black box trigger event comprises:
    when the intelligent driving vehicle is in an intelligent driving mode, a hardware fault occurs on the intelligent driving vehicle, wherein the hardware fault comprises a processor reset and a sensor fault.

13. The method according to claim 1, wherein the black box trigger event comprises:
    when the intelligent driving vehicle is in an intelligent driving mode, a collision occurs between the intelligent driving vehicle and another vehicle or object.

14. The method according to claim 1, wherein the black box trigger event comprises:
    when the intelligent driving vehicle is in an intelligent driving mode, the intelligent driving vehicle brakes emergently.

15. The method according to claim 1, wherein the black box trigger event comprises:
    when the intelligent driving vehicle is in an intelligent driving mode, an instantaneous acceleration of the intelligent driving vehicle exceeds a preset value.

16. The method according to claim 1, wherein the method further comprises:
    when a collision occurs on the intelligent driving vehicle, permanently storing the black box trigger event, a timestamp of the black box trigger event, and one or more of the following data in a preset time period before and after the black box trigger event: key demarcation data, system status, positioning and planning and control structured data, structured data of close distance traffic participants, or sensor data in the direction of the collision.

17. The method according to claim 1, wherein the method further comprises:
    when a collision occurs on the intelligent driving vehicle, storing sensor data of the intelligent driving vehicle in a preset time period before and after the black box trigger event occurs.

18. The method according to claim 1, wherein the method further comprises:
    when no collision occurs on the intelligent driving vehicle, storing one or more of the following data in a preset time period before and after the black box trigger event: sensor data in the intelligent driving vehicle, a driver status, a driving subject, or vehicle body data.

19. A black box data management apparatus for an intelligent driving vehicle, comprising:
    at least one processor; and
    a non-transitory computer-readable storage medium coupled to the at least one processor and storing programming instructions, the programming instructions, when executed by the at least one processor, cause the at least one processor to perform the following operations:
    obtaining black box data based on a black box trigger event, wherein the management apparatus is configured to manage the black box data in the intelligent driving vehicle;
    evaluating a storage level of the black box data based on an event type of the black box trigger event and a data type of the black box data, wherein the data type of the black box data comprises responsibility demarcation data, assistant demarcation data and risk data; and
    storing the black box data based on the storage level and according to a preset rule, wherein
      when the event type of the black box trigger event is collision, classifying black box data of the responsibility demarcation data type as first-level storage data, and black box data of the assistant demarcation data type as second-level storage data
      when the event type of the black box trigger event is non-collision, classifying black box data of the risk data type as third-level storage data,
      when the black box data is classified as the first-level storage data, storing the black box data of the responsibility demarcation data type in a local storage of the black box device and a cloud storage, wherein the black box data of the responsibility demarcation data type is permanently stored in the local storage and the cloud storage, when the black box data is classified as the second-level storage data, sending the black box data of the assistant demarcation data type to the cloud storage, wherein the black box data of the assistant demarcation data type is not permanently stored in the cloud storage, and when the black box data is classified as the third-level storage data, storing the black box data of the risk data type in the local storage of the black box device and sending the black box data of the risk data type to the cloud storage, wherein the black box data of the risk data type is not permanently stored in the local storage and the cloud storage.

* * * * *